Feb. 29, 1944.   R. GUNN   2,342,660
CALCULATOR
Filed Jan. 11, 1940   3 Sheets-Sheet 2
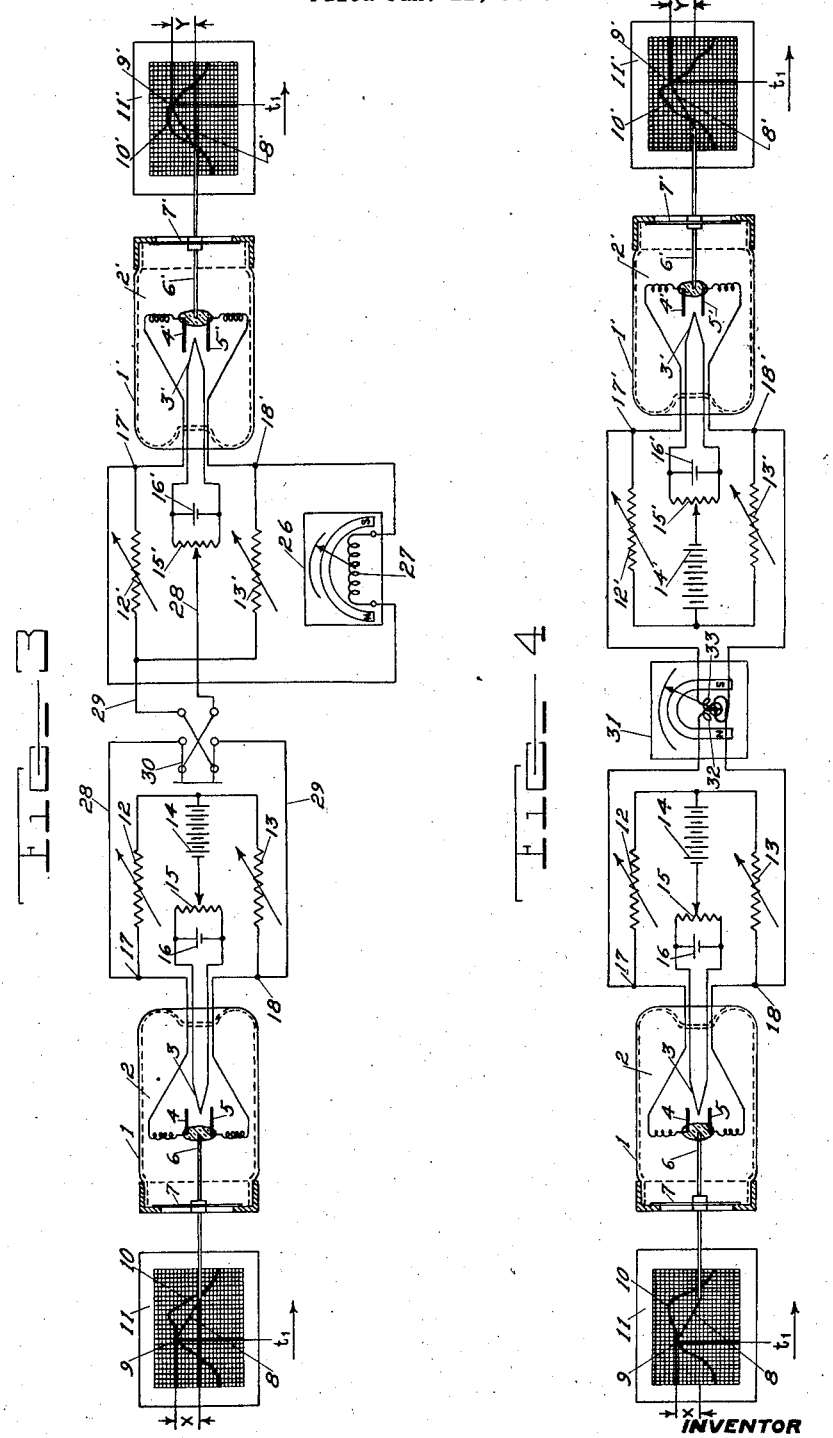
INVENTOR
Ross Gunn
BY
ATTORNEY Feb. 29, 1944.  R. GUNN  2,342,660
CALCULATOR
Filed Jan. 11, 1940  3 Sheets-Sheet 3
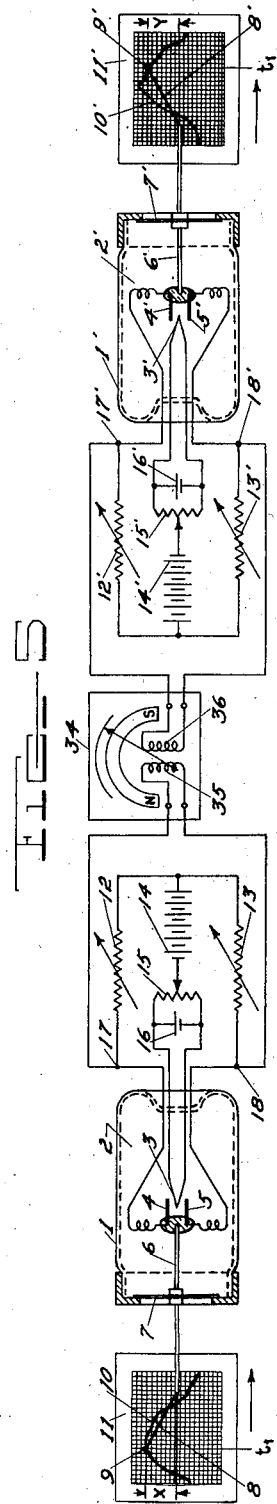
INVENTOR
Ross Gunn
BY
ATTORNEY Patented Feb. 29, 1944

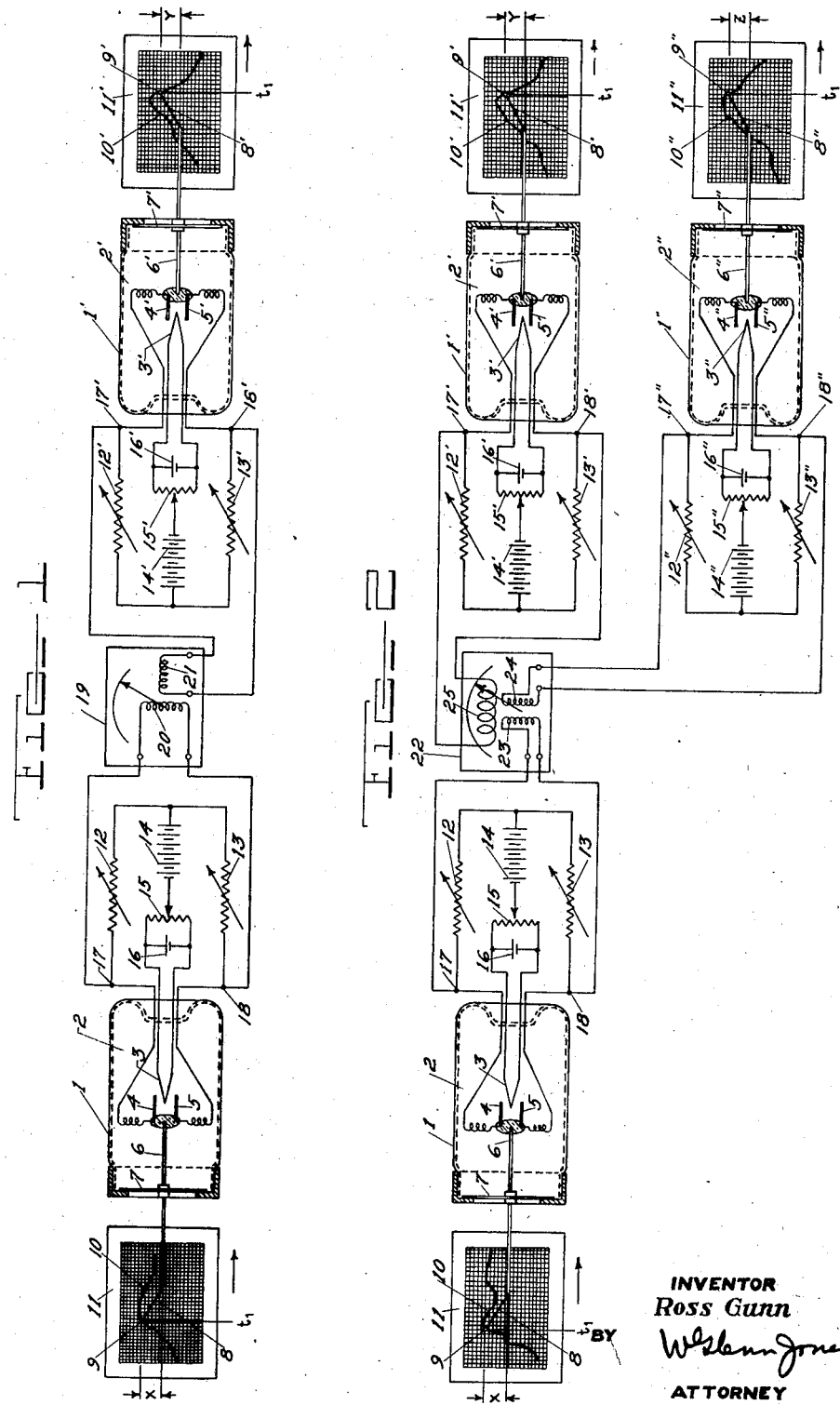

2,342,660

UNITED STATES PATENT OFFICE 2,342,660

CALCULATOR

Ross Gunn, Washington, D. C.

Application January 11, 1940, Serial No. 313,354

5 Claims. (Cl. 235—61)

(Granted under the act of March 3, 1883, as amended April 30, 1928; 370 O. G. 757)

My invention relates to a calculator and more particularly to an electrical calculator for computing the product, the ratio or the algebraic sum of a plurality of mechanical displacements.

The calculator of the present invention broadly stated comprises electromechanical means for producing electrical quantities proportional to a plurality of mechanical displacements and an electrical instrument under the control of the aforesaid means. The instrument is so chosen as to indicate a quantity proportional to either the product, the ratio or the algebraic sum of the mechanical displacements.

While any convenient electromechanical means may be utilized for converting a mechanical displacement into an appropriate electrical quantity, I prefer to employ a special electromechanical means devised by me because of the high degree of linearity as well as the high degree of electrical and mechanical stability attainable therewith. This electromechanical means comprises a bridge circuit and a space discharge device connected to form two arms or branches thereof. The discharge device includes an envelope enclosing at least three electrodes at least one of which is electron emissive and at least one of which is movable, and means responsive to a mechanical displacement for imparting movement to at least the movable electrode. If the bridge circuit is first balanced prior to any computing operations, any subsequent movement of the movable electrode will cause an unbalancing of the circuit with the attendant production of a voltage in one bridge diagonal proportional to the mechanical displacement.

In the light of the foregoing, it is among the several objects of my invention to provide an economical and durable electrical calculator of general application for computing the product, the ratio or the algebraic sum of a plurality of mechanical displacements however produced; and to provide a calculator of the stated character having a high degree of linearity as well as a high degree of electrical and mechanical stability. It is also a specific object of this invention to provide a calculator for computing the product of an algebraic sum of a first and second mechanical displacement with a third mechanical displacement.

Other objects and many of the attendant advantages of this invention will be appreciated as the same becomes better understood by reference to the following detailed description when considered in connection with the accompanying sheets of drawings wherein:

Fig. 1 discloses one embodiment of my invention for calculating the product of a plurality of mechanical displacements;

Fig. 2 discloses another embodiment of the present invention for calculating the prdouct of the algebraic sum of a plurality of displacements with another displacement;

Fig. 3 discloses a still further embodiment of my invention for calculating the product of a plurality of mechanical displacements that is highly economical and compact in structure;

Fig. 4 depicts an embodiment of the present invention for calculating the ratio of a plurality of mechanical displacements; arid Fig. 5 depicts a still further embodiment of my invention for calculating the algebraic sum of a plurality of mechanical displacements.

Before proceeding with a detailed description of the various embodiments of my invention it is deemed advisable at this point in the interest of clarity and in order to avoid needless repetition in the subsequent description to make certain general remarks concerning the space discharge devices and circuits employable in my calculator.

As pointed out hereinbefore, each space discharge device includes at least one electron emissive electrode. This electrode, in each instance, is intended to serve as the cathode. A cursory examination of the drawings will show that all cathodes have been depicted therein as of the thermionic type, the heating thereof to insure electron emission being accomplished directly by a suitable source of electromotive force. I wish to emphasize in this connection, however, that I do not desire to be restricted to this type of cathode since cathodes which emit electrons due to bombardment by rapidly moving ions, electrons, or metastable atoms and are said to be secondarily emissive, or photoelectric cathodes, or cold or non-thermionic cathodes which spontaneously emit electrons due to treatment thereof by a radioactive substance, all will serve the purpose of my invention equally well. As for the thermionic cathode, it may be either of the directly or indirectly heated type and be fabricated of a pure metal, be oxide-coated, be of a metal provided with an adsorbed monatomic film of one of the electro-positive metals or be of any other type known to the art.

The envelopes of my space discharge devices, which are fashioned from any of the materials known to the prior art and serve to enclose the electrodes, may be evacuated to produce a high vacuum and thus insure a substantially pure electron discharge or may alternatively be provided with a suitable filling of a gas or vapor, gases or vapors, or mixtures of gases and vapors at a selected pressure or pressures to insure the desired operating characteristics.

It will be further noted from an examination of the drawings that the space discharge devices are shown in each instance as incorporating two movable anodes and a stationary cathode, the anodes of which are conjointly movable with respect to the envelope and the cathode in response to any mechanical displacement. The electrode arrangement employable in the present invention, however, is not to be understood as being restricted to the foregoing structure. It is only necessary that the envelope enclose at least three electrodes, at least one of which is electron emissive and at least one of which is movable with respect to the envelope so that movement of at least the movable electrode will cause an increase in resistance between a plurality of electrodes simultaneously with a decrease in a like resistance. Any number of tube structures will satisfy the foregoing essential requirements and will readily suggest themselves to those skilled in the art in the light of the teachings herein.

The circuits that may be employed in the various embodiments of my invention take the form of a Wheatstone bridge in which three electrodes of a space discharge device are connected to form two branches thereof, the remaining two branches or arms being constituted by two variable resistances which serve to effect a balancing of the bridge circuit prior to any calculating operation. Means responsive to a mechanical displacement imparts movement to at least one of the three electrodes to cause simultaneously thereamong a decrease in electrical resistance between the first and second electrodes and an increase in electrical resistance between the first and third electrodes, thus causing an unbalancing of the bridge circuit with the attendant production of a suitable electrical quantity in one bridge diagonal proportional to the mechanical displacement.

Turning now to the several figures of the drawings, there is shown depicted therein, by way of example, a plurality of space discharge devices identified in general by the reference characters 1, 1' and 1". These devices comprise envelopes 2, 2' and 2" enclosing thermionic cathodes 3, 3' and 3" stationarily mounted with respect to their respective envelopes and interposed between a pair of conjointly movable anodes 4, 5, 4', 5' and 4", 5", the three electrodes in each space discharge device being mounted for simultaneous cooperation and being disposed to cause an increase in one anode-cathode resistance simultaneously with a decrease in a like resistance. The two anodes 4, 5, 4', 5' and 4", 5" in the respective space discharge devices 1, 1' and 1" are respectively secured to the elongated members or arms 6, 6' and 6" and are electrically insulated from each other and from the arm in any suitable manner. Each arm as shown extends from the envelope interior to a point exteriorly thereof and at its point of emergence is flexibly and hermetically sealed to the envelope by the employment of any of the well-understood expedients known to the prior art. Thus, purely by way of example, the arms 6, 6' and 6" are shown secured to flexible diaphragms 7, 7' and 7", which in turn are hermetically sealed in any suitable manner to their respective envelopes 2, 2' and 2".

The arms 6, 6' and 6" have fixedly secured at their extremities rigid members 8, 8' and 8" provided with pins 9, 9' and 9" that engage and slide within their respective grooves 10, 10' and 10" of the movable contour boards 11, 11' and 11". The grooves 10, 10' and 10" are shaped to conform to different functional relationships which may be denoted respectively as $X = f(t_1)$, $Y = f'(t_1)$ and $Z = f''(t_1)$. Each of the space discharge devices 1, 1' and 1" is shown with its anodes symmetrically arranged with respect to its cathode and the bridge circuit balanced preparatory to any calculating operation. The vertical displacements $\Delta X$, $\Delta Y$ and $\Delta Z$ of the respective pins 9, 9' and 9" from their positions of rest X, Y and Z occasioned by relative movement of the contour boards and space discharge devices are the mechanical displacements that are to enter into the calculations. The space discharge devices 1, 1' and 1" are shown, by way of example, as fixedly positioned while the contour boards 11, 11' and 11" are to be thought of as horizontally movable in the directions indicated.

Thus, it should be clear that any relative movement of the contour boards and the tubes or space discharge devices will cause mechanical displacements of the several pins 9, 9' and 9". These pins, by virtue of their interconnection with the respective anodes 4, 5, 4', 5' and 4", 5" will impart movement to these electrodes causing simultaneously a decrease in spacing between the first anode and the cathode and an increase in spacing between the second anode and the cathode, the variation in spacing in each instance being directly proportional to the mechanical displacement. In consequence of the foregoing, there will be produced an increase in one interelectrode ohmic resistance simultaneously with a decrease in a like resistance. It is to be emphasized that any mechanical displacement however produced may be employed for imparting movement to the various tube electrodes; and that the arrangement depicted in the drawings is shown merely for the purpose of illustrating the principle underlying the present invention as well as its generic character.

The space discharge devices 1, 1' and 1" are each connected in a bridge circuit to form two branches or arms thereof, the remaining two branches being constituted respectively by the variable balancing resistances 12, 13, 12', 13' and 12", 13". It is thus seen that the bridge circuits each include four arms or branches, two of which are formed by the ohmic resistances between the anodes 4, 4', 4" and cathodes 3, 3', 3" and anodes 5, 5' 5" and cathodes 3, 3', 3" with the balancing resistances 12, 13, 12', 13' and 12", 13" heretofore mentioned forming the remaining two branches. Suitable sources of electromotive force 14, 14' and 14" are connected across one diagonal of the respective bridge circuits for energizing the same and have one terminal slidably engaging resistances 15, 15' and 15" in shunt respectively with sources of electromotive force 16, 16' and 16" which serve to heat the cathodes 3, 3' and 3" of the space discharge devices to an electron emissive temperature. The resistances 15, 15' and 15" shunting the sources of electromotive force 16, 16' and 16" provide additional means for balancing the various bridge circuits.

From the foregoing it should be clear that if the bridge circuits are initially balanced prior to any calculating operation, any differential voltage subsequently developed across the diagonals 17, 18, 17', 18' and 17", 18" will be directly proportional to the mechanical displacements causing the same. Thus, effective electromechanical means have been provided for converting mechanical displacements into appropriate electrical quantities, which quantities in turn are impressed upon suitably chosen electrical instruments for indicating either the product, the ratio or the algebraic sum of the mechanical displacements.

Referring now separately and in seriatim to the several figures of the drawings, it will be observed that a suitable electrical instrument 19 is shown in Fig. 1 for indicating a quantity proportional to the product of a plurality of mechanical displacements. This instrument may be of the dynamometer type and includes a movably mounted coil 20 to which a pointer is secured arranged to turn in a magnetic field produced by a second fixed but independent coil 21. The coils 20 and 21 are electrically connected to the respective diagonals 17, 18 and 17′, 18′ of the two bridge circuits. Such an instrument indicates by its pointer a quantity proportional to the product of the two currents in the coils. If the bridge circuits of Fig. 1 are balanced prior to any calculating operation, mechanical displacements $\Delta X$ and $\Delta Y$ of the pins 9 and 9′ will cause currents to flow in the coils 20 and 21 that are respectively proportional to these displacements. Hence, the instrument 19 will indicate a quantity that is proportional to the product of the mechanical displacements or a quantity proportional to $\Delta X \cdot \Delta Y$. The instrument 19 may, of course, be calibrated in any suitable manner.

In Fig. 2 an electrical instrument 22 is employed for indicating a quantity proportional to the product of the algebraic sum of two mechanical displacements with a third mechanical displacement. The instrument 22 is of the multiple coil type and includes a plurality of independent movable coils 23 and 24 wound in the same plane to which is secured a pointer and arranged to turn as a unit in the magnetic field produced by a third fixed but independent coil 25. Coils 23, 24 and 25 are electrically connected to the respective diagonals 17, 18, 17″, 18″ and 17′, 18′ of the respective bridge circuits. The instrument 22 indicates by its pointer a quantity proportional to the product of the algebraic sum of the two currents in the coils 23 and 24 with the current in the coil 25. If the bridge circuits of Fig. 2 are balanced prior to any calculating operation, mechanical displacements $\Delta X$, $\Delta Y$ and $\Delta Z$ of the pins 9, 9′ and 9″ will cause currents to flow in the coils 23, 24 and 25 that are proportional to these displacements. Hence, the instrument 22 will indicate a quantity that is proportional to the product of the algebraic sum of two mechanical displacements with a third mechanical displacement or $(\Delta X \pm \Delta Z) \cdot \Delta Y$. As in the preceding embodiment, the instrument 22 may be calibrated in any suitable manner.

In Fig. 3, an electrical instrument 26 of either the current or voltage type is employed for indicating a quantity proportional to the product of a plurality of mechanical displacements. This instrument includes a movable coil 27 to which is secured a pointer arranged for movement in a suitable magnetic field. The coil 27, as shown, is electrically connected across the diagonal 17′, 18′ of the second bridge circuit. The remaining diagonal of this bridge circuit is connected by conductors 28 and 29 to be energized by any voltage generated across the diagonal 17, 18 of the first bridge circuit, a double-pole double-throw switch 30 being provided to make certain that a voltage of proper polarity will at all times be impressed upon the second bridge circuit. If the two bridge circuits are first balanced prior to any calculating operation, a variable voltage proportional to a mechanical displacement $\Delta X$ of the pin 9 will be impressed upon the second bridge circuit by the first with the result that any voltage produced across the diagonal 17′, 18′ of the second bridge circuit will be proportional to the product of the two mechanical displacements of the pins 9 and 9′ or proportional to $\Delta X \cdot \Delta Y$ so long as the plate voltage impressed upon the space discharge device 1′ does not approach the saturation value. Thus, the instrument 26 will indicate a quantity that is proportional to the product of two mechanical displacements. The instrument 26 may be calibrated in any suitable manner. This embodiment of the invention possesses the very real advantage of operating with a minimum supply of electrical energy and hence provides a very compact and economical apparatus.

In Fig. 4, the electrical instrument 31 is of the ratio type and, as such, will indicate a quantity proportional to the ratio of a plurality of mechanical displacements. As shown, purely by way of example, this instrument includes a plurality of independent coils 32 and 33 arranged at right angles to each other and mounted to turn as a unit on a single axis with a pointer in a suitable magnetic field. The coils 32 and 33 are electrically connected to the respective diagonals 17, 18 and 17, 18′ of the bridge circuits. The instrument 31 indicates by its pointer a quantity proportional to the ratio of the two currents in the coils 32 and 33. If the bridge circuits of Fig. 4 are balanced prior to any calculating operation, mechanical displacements $\Delta X$ and $\Delta Y$ of the pins 9 and 9′ will cause currents to flow in coils 32 and 33 that are respectively proportional to these displacements. Hence, the instrument 31 will indicate a quantity that is proportional to the ratio of the mechanical displacements or a quantity proportional to the ratio between $\Delta X$ and $\Delta Y$. The instrument may be calibrated in any suitable manner.

The electrical instrument 34 in Fig. 5 serves to indicate a quantity proportional to the algebraic sum of a plurality of mechanical displacements. This instrument is of the multiple coil type and includes a plurality of independent movable coils 35 and 36 wound in the same plane to which is secured a pointer and arranged to turn as a unit in a suitable magnetic field. The coils 35 and 36 are electrically connected to the respective diagonals 17, 18 and 17′, 18′ of the bridge circuits. Such an instrument indicates by its pointer a quantity proportional to the algebraic sum of the currents in its coils. If the bridge circuits of Fig. 5 are balanced prior to any calculating operation, mechanical displacements $\Delta X$ and $\Delta Y$ of the pins 9 and 9′ will cause currents to flow in the coils 35 and 36 that are respectively proportional to these displacements. Hence, the instrument 34 will indicate a quantity that is proportional to the algebraic sum of the two mechanical displacements or a quantity proportional to $(\Delta X \pm \Delta Y)$. The instrument 34, as in the preceding embodiments, may be calibrated in any convenient manner.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. An electrical calculator comprising in combination electromechanical means for converting a mechanical displacement from either side of a zero quantity reference position into an electrical potential, the magnitude of said electrical potential being proportional to said displacement, and the polarity of said electrical potential resulting from a displacement one side of said zero quantity reference position being opposite the polarity of said electrical potential resulting from a displacement on the other side of said zero quantity reference position, a second electromechanical means converting a second mechanical displacement from either side of a zero quantity reference position into a second electrical potential, the magnitude of said second electrical potential being proportional to said second displacement, and the polarity of said second electrical potential resulting from a displacement one side of said zero quantity reference position being opposite the polarity of said electrical potential resulting from a displacement the other side of said zero quantity reference position, an electrical instrument energized by the electrical potential of each of said means to indicate a quantity proportional to the desired calculated quantity based upon the aforesaid mechanical displacements, at least one of the aforesaid means comprising an envelope enclosing at least three electrodes at least one of which is electron emissive and at least one of which is movable, and means for imparting movement to said electrode proportional to said mechanical displacement associated with said means.

2. A calculator for electrically indicating a quantity proportional to the product of the algebraic sum of a first and second mechanical displacement from either side of a zero quantity reference position with a third mechanical displacement from either side of a zero quantity reference position, the combination including separate electromechanical means for converting each of the aforesaid mechanical displacements into a voltage having a magnitude variable directly therewith, the voltage resulting from a displacement one side of said zero quantity reference position being opposite in polarity to the voltage resulting from a displacement on the other side of said position, an electrical instrument for indicating said product having fixed and rotatable members, one of said members comprising a pair of relatively immovable coils each mounted with their axes coplanar, the other of said members having a third independent coil, said movable member being mounted for movement in the field produced by the coil windings of said fixed member, and conductors connecting each coil to its respective means, said pair of relatively immovable coils being each connected to be energized respectively by the voltage output resulting from said first and second displacement, and said third coil being connected to be energized by the voltage output resulting from said third mechanical displacement, at least one of said separate means comprising a bridge circuit and a space discharge device connected to form two branches thereof, the said discharge device comprising an envelope enclosing at least three electrodes, at least one of which is electron emissive and at least one of which is movable, and means for imparting movement to said electrode proportional to said mechanical displacement associated with said means.

3. An electrical calculator comprising in combination electromechanical means for converting a mechanical displacement from either side of a zero reference position into a voltage having a magnitude directly proportional to said displacement, the voltage resulting from a displacement one side of said zero reference position being opposite in polarity to the voltage resulting from a displacement on the other side of said position; a second electromechanical means adapted to be actuated by a second mechanical displacement from either side of a zero reference position, said second means being connected to be energized by the voltage resulting from said first mechanical displacement, whereby the voltage resulting from said second mechanical displacement will be proportional to the algebraic product of said second mechanical displacement from either side of said reference position and the voltage magnitude energizing said means; at least one of said electromechanical means comprising a four element bridge circuit having an input and a measuring diagonal, a space discharge device connected across the measuring diagonal to form two branches thereof, a variable resistance element connected to said measuring diagonal to form the other two branches thereof, said space discharge device including an envelope enclosing three electrodes, at least one of which is electron emissive, and at least one of which is movable; and means for imparting movement to said electrode proportional to said mechanical displacement associated with said means.

4. An electrical calculator comprising in combination electromechanical means for converting a mechanical displacement from either side of a zero quantity reference position into a voltage having a magnitude directly proportional to said displacement, the voltage resulting from a displacement one side of said zero reference position being opposite in polarity to the voltage resulting from a displacement on the other side of said zero reference position; a second electromechanical means adapted to be actuated by a second mechanical displacement from either side of a zero quantity reference position, said second electromechanical means producing a voltage having a magnitude directly proportional to the product of the second mechanical displacement and the voltage energizing said means, the polarity of the voltage output of said second means indicating the direction of said second displacement from said reference position, at least said second means including an envelope enclosing at least three electrodes, at least one of which is electron emissive; circuit forming means including a reversing switch for applying the output voltage of said first named means to the said second named means so that said electron emissive electrode of said second means when energized by the voltage output of said first means may be negative with respect to another of said electrodes irrespective of the direction of the said first displacement from its reference position; and an electrical instrument connected to said second means for indicating the magnitude and polarity of its voltage output, the position of said switch being indicative of the algebraic sign of said first displacement whereby the algebraic product of said displacements may be readily determined.

5. An electrical calculator comprising the combination of an electrical power supply source; a pair of Wheatstone bridge circuits, each bridge circuit containing input and output terminals, a pair of resistance elements forming two arms thereof serially connected across said output terminals and to a point intermediate the ends of one of said input terminals, a space discharge device forming the other two arms of each of said bridge circuits having an envelope enclosing an electron emissive cathode connected to the other input terminal and a pair of anodes each connected to a separate one of said output terminals; means for imparting relative movement between said anode and cathode of each bridge circuit proportional to separate mechanical displacements from either side of a zero reference position so that as the distance between an anode and cathode forming one arm of said bridge is increased the distance between an anode and cathode forming another arm of said bridge is correspondingly decreased; means connecting the input terminals of a first one of said bridge circuits to said supply source, and means including a reversing switch connecting the output terminals of said first one of said bridge circuits to the input terminals of the other of said bridge circuits so that the cathode of said second bridge circuit is negative relative to its respective anodes irrespective of the direction of said first displacement, and the voltage output thereof has a magnitude directly proportional to the product of said displacements and a polarity indicative of the direction of said second displacement from its zero reference position, the position of said reversing switch indicating the direction of said first displacement from its zero reference position; and means for indicating the magnitude and polarity of the voltage output of said second bridge whereby the algebraic product of said first and second displacements may be readily determined.

ROSS GUNN.